INVENTOR.
ROBERT A. PENDLETON
BY
Henry L. Hanson
ATTORNEY

INVENTOR.
ROBERT A. PENDLETON
BY Henry L. Hanson
ATTORNEY

United States Patent Office 3,289,188
Patented Nov. 29, 1966

3,289,188

MECHANICAL APPARATUS FOR CONTROLLING MOVEMENT OF A FLEXIBLE MEDIUM

Robert A. Pendleton, Dedham, Mass., assignor to Honeywell Inc., a corporation of Delaware Filed Jan. 22, 1962, Ser. No. 167,615
9 Claims. (Cl. 340—174.1)

A general object of the present invention is to provide a new and improved apparatus useful in the control of the movement of a data storage tape. More specifically, the present invention is concerned with a data storage tape transfer mechanism which is characterized by the unique arrangement of the data transfer means relative to an associated tape movement control surface which will minimize the effects of the control surface on the tape insofar as it relates to the ability of the tape to respond to a data transfer function relative thereto.

Data storage tapes are widely used for storing large quantities of digital data very efficiently. Magnetic and electrostatic tapes have been found to be particularly useful in this regard particularly in connection with electronic data processing systems. When data storage tapes are used in conjunction with data processing systems, it is generally necessary that these tapes be driven at a relatively high speed with respect to an associated data transfer means. It is also necessary that the tape be started and stopped very rapidly. The mechanisms used for starting and stopping a tape may take various forms. One form that is particularly suited for this purpose is a form sometimes referred to as a pneumatic tape drive. Such a tape drive may well comprise a pair of contra-rotating capstans positioned adjacent to the tape. When a vacuum is coupled to one or the other of the contra-rotating capstans, this vacuum is arranged to be communicated through holes in the peripheral surface of the capstans so that the vacuum will pull the adjacent tape against the capstan into a mechanical driving relationship to move the tape in the desired direction. In order to stop the tape, the tape may be arranged to pass over a pneumatic braking surface which is arranged to have a pneumatic signal coupled thereto for purposes of drawing the tape against the braking surface and stopping tape movement when it is desired to stop driving the tape.

In a pneumatic tape transport, the vacuum signal acting through holes in the movement control surface will draw the tape into engagement therewith and in doing so, there is a tendency for the tape to be drawn into the openings in the control surface. This may cause a certain amount of flexing and abrasion of the tape in the immediate vicinity of the openings in the surface. With certain types of tapes such as plastic tape, material from the tape may be, in effect, scraped off and accumulated in the control surface openings to be subsequently picked up on the tape as dust and as large particles. If allowed to build up sufficiently, the recording properties of the tape may be impaired so that there will be a loss of recorded information. These effects may be minimized, in accordance with the teachings of the present invention, by a unique arrangement of the pneumatic openings in the associated control surface relative to the areas where the data transfer is to take place.

It is therefore a more specific object of the present invention to provide a new and improved tape transport arranged so that the movement-controlling apparatus associated with the tape is adapted to effect an operative coupling to the tape at locations on the tape which are limited in area and are independent of the areas where a data transfer is to take place.

A still further object of the present invention is to provide a new and improved tape movement-controlling apparatus of the pneumatic type wherein a tape movement control surface has formed on the tape engaging side thereof a plurality of slots which are arranged across the control surface and positioned so that the slots extend along the path of travel of the tape and wherein the data transfer means associated with the tape is arranged to transfer data relative to a plurality of channels with each channel being positioned to transfer data relative to the tape along paths which pass between the slots on the movement control surface.

Another more specific object of the present invention is to provide a new and improved brake of the pneumatic type for a movable tape wherein the brake comprises a plurality of pneumatic openings extending across the brake surface and where the brake openings are arranged to be active only along restricted lines along the path of travel of the tape so that data transfer means may be arranged to cooperate with the tape in areas or paths between the lines on the tape.

The foregoing objects and features of novelty which characterize the invention, as well as other objects of the invention, are pointed out with particularity in the claims annexed to and forming a part of the present specification. For a better understanding of the invention, its advantages and specific objects attained with its use, reference should be had to the accompanying drawings and descriptive matter in which there is illustrated and described a preferred embodiment of the invention.

Figure 1:
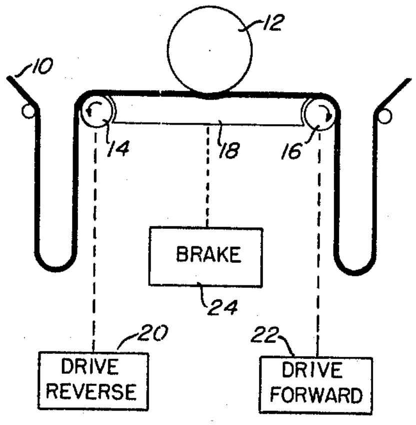
FIGURE 1 illustrates a representative form of tape transport mechanism which may incorporate the principles of the present invention.

Referring first to FIGURE 1, there is illustrated here the basic elements commonly associated with a pneumatic tape transport. The tape transport described herein is one which is arranged to move a flexible tape past a data transfer mechanism with means provided for rapidly starting and stopping the tape relative to the transfer head. As is more fully explained hereinafter, the data transfer mechanism is uniquely associated with those areas of the data tape which are not engaged by or operatively associated with the movement-controlling portion of the apparatus.

Considering FIGURE 1 more specifically, it is desired that a data transfer tape 10 be arranged to be driven past a data transfer mechanism 12. In a preferred embodiment, the data tape 10 took the form of a magnetic tape having a surafce thereof coated with suitable materials capable of storing magnetic signals that are transferred thereto by way of the transfer mechanism 12. The transfer mechanism 12 preferably takes the form of a magnetic reading and writing circuit comprised of a plurality of separate recording heads spaced from each other and arranged to transfer data into selected channels extending along the length of the tape 10.

The movement of the tapes is controlled by a pair of contra-rotating capstans 14 and 16. Capstans 14 and 16 may well take the form of perforated cylinders arranged to communicate with a vacuum source by way of a suitable valving means so that the vacuum may be selectively coupled to one or the other of the capstans. When a vacuum is coupled to a particular capstan, the tape 10 passing adjacent thereto will be moved into mechanical engagement with the capstan and a driving action will take place.

Positioned between the capstans 14 and 16 is a brake 18 which is in the form of a pneumatic brake. This pneumatic brake is also arranged to communicate with a vacuum source and, if desired, may be pneumatically switched to selectively control the application of a braking vacuum to the tape which passes thereover. The switching of the drive capstans and the brake may be selectively controlled by mechanisms indicated generally at 20, 22 and 24 to provide a drive reverse signal, a drive forward signal and brake signal respectively. Such switching mechanism may take the form of mechanism illustrated and described in the R. A. Pendleton Patent 2,995,149.

Figure 2:
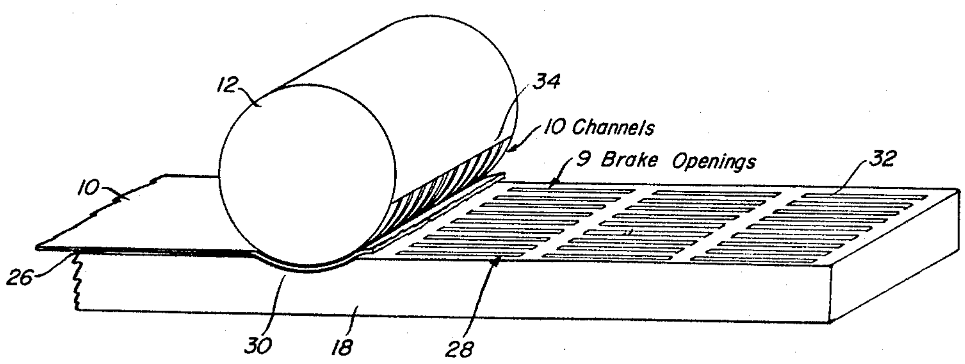
FIGURE 2 illustrates perspectively a multiple-lane transfer head positioned to work in combination with a magnetic tape and a tape brake.

Referring next to FIGURE 2, a more detailed illustration of the relationship of the parts in the apparatus may be understood. As illustrated here, the brake in the apparatus is arranged in two separate sections 26 and 28 on opposite sides of the data transfer means 12. An arcuate depression is cut into the brake 18 at 30 so that the arcuate surface of the lower side of the data transfer mechanism 12 may project into this depression. Thus, when the tape 10 is passed over the brake 18 and under the data transfer mechanism 12, there will be a certain amount of "wrap-around" of the tape with respect to the recording heads within the data transfer mechanism 12.

The separate sections of the brake 18 at 26 and 28 may have the tape-engaging portions thereof arranged in a substantially identical manner with a plurality of longitudinal slots positioned laterally across the face of the brake section. The longitudinal slots are indicated with respect to the brake section 28 at 32. The data transfer mechanism 12, as indicated above, may have a plurality of separate magnetic recording heads 34 enclosed therein with the recording gaps of the separate heads being arranged to engage the tape for data transfer purposes. Each of the recording heads 34 is arranged to be associated with a separate recording channel on the tape 10.

Figure 3:
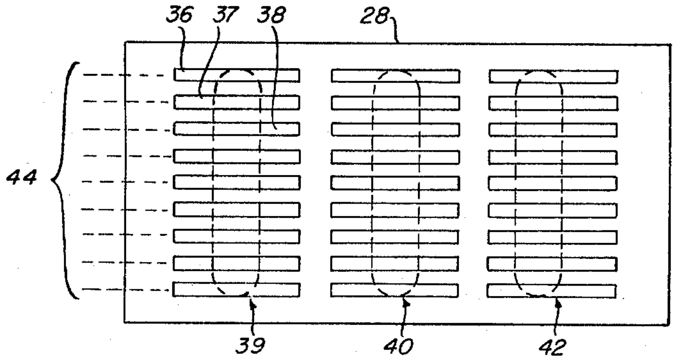
FIGURE 3 illustrates in a plan view a portion of the brake surface which may be used in FIGURE 2.

A more detailed showing of the brake section 28 is illustrated in FIGURE 3 wherein a plan view of the brake surface is shown. In this figure, a plurality of longitudinal slots, such as the slots 36, 37 and 38 are cut in the surface of the brake section 28 so as to extend along the path of travel of the tape and across the tape in a column 39. A further series of slots forming a second column is indicated generally at 40. A third series of slots is formed in a column 42. It will be noted that the longitudinal slots in each of the columns 39, 40 and 42 are arranged along a line so that the tape-engaging portion of the brake surface will be operative only along a restricted set of lines extending along the longitudinal dimension of the brake surface 28 and thereby along the path of travel of the tape which is adapted to pass over the surface. These lines are indicated by way of the dotted lines 44. The space between the respective slots, such as the slots 36 and 37, 37 and 38, define land areas on the surface and thereby longitudinal paths which extend along the brake surface. The data transfer operations carried out by way of the data transfer mechanism 12 are arranged to take place in the paths defined by the land areas on the brake surface.

Figure 4:
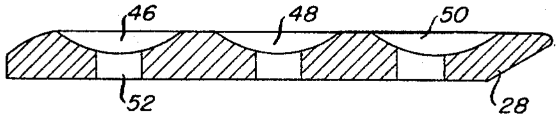
FIGURE 4 illustrates a longitudinal sectional view of the brake surface of FIGURE 2.

The manner in which the brake section is actually formed with slots therein is illustrated by way of FIGURE 4. In this figure the individual slots 46, 48 and 50 are shown on surface 28 and correspond to slots in the columns 39, 40 and 42 of FIGURE 3. Slots 46, 48 and 50 may well be milled out by a conventional milling machine to have an arcuate cross-section. An opening such as the opening 52 is cut in the bottom of the arcuate sections so as to communicate a pneumatic signal to the slot at the surface.

Figure 5:
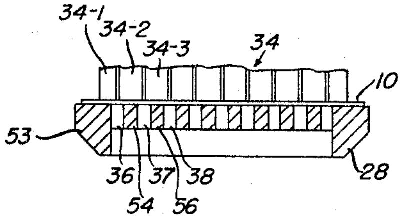
FIGURE 5 illustrates a lateral cross-sectional view of the brake surface of FIGURE 2.

FIGURE 5 illustrates a lateral cross-sectional view of the brake section 28 and shows the relationship of the recording heads 34 relative to the individual slots cut on the section 28. It will be seen in this figure that the slots 36 and 37 are separated from each other by a predetermined amount and separation is bridged by a land section 54. The space between the slots 37 and 38 is bridged by further land section 56.

As shown in FIGURE 5, the recording head 34–1 is positioned to cooperate with the outer land area 53 of the surface of section 28. The junction between the heads 34–1 and 34–2 is arranged to be positioned along a line which extends through or over the center of the slot 36. The head 34–2 is arranged to span the land area 54. The junction between the head 34–2 and 34–6 is arranged to extend along a line passing over the slot 37. The head 34–3 is arranged to span the land area 56. It will be apparent that the individual recording heads operate on the tape 10 along the defined paths that are not associated with the tape movement-controlling action of the surface 28 and consequently any perceptible wear or other deterioration of the tape resulting from the operation of the brake surface by way of the motion-controlling slots will not have an effect on the data transfer to be performed relative to the tape.

Figure 6:
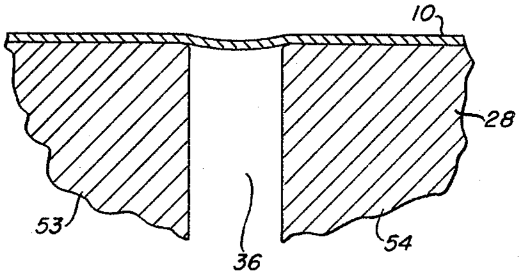
FIGURE 6 illustrates in expanded detail a view of the tape passing over an opening in the tape brake.

FIGURE 6 illustrates in expanded detail a portion of the brake section 28 with the slot 36 positioned between the land areas 53 and 54. The tape 10 is shown passing over the surface of the section 28. When the vacuum source is coupled to the slot 36, there will be a tendency for the tape 10 to be pulled down into the opening at the upper end of slot 36 and it is this slight flexing of the tape 10 over the slot 36 that has a tendency to create a plastic dust which will accumulate in the opening and around the edges. The dust may also be picked up and carried on the tape to be subsequently imbedded therein as the tape is wound onto the associated supply reels, not shown. If this dust is not limited in the areas where it may accumulate on the surface of the tape, there may be a resultant loss of information in the transfer of data between the tape and the transfer mechanism 12. The surface of the tape adjacent to the control surface will determine what type of dust may be created, such as plastic dust, magnetic oxide dust, or the like. In any event, the effects thereof are minimized.

It will be seen from the foregoing that the present invention provides a unique arrangement of a multiple-channel data transfer mechanism relative to a tape movement control member. The control member is adapted to engage the tape along restricted lines extending along the length of the tape so that it is possible to define on the surface of the tape a series of paths which may be used in the data transfer operation. This may be done without the need to be concerned about any wear along restricted lines affecting the recording or data transfer properties of the apparatus. It will be apparent that the principles of invention may be carried to the capstans 14 and 16 illustrated in FIGURE 1. The principles of the invention may also be carried to other types of drive mechanisms for use in tape transports such as pinch rollers, and the like, wherein the driving is performed with respect to the tape along lines which are not associated with the recording path of the associated data transfer means.

While, in accordance with the provisions of the statutes, there have been illustrated and described the best forms of the invention known, it will be apparent to those skilled in the art that changes may be made in the apparatus described without departing from the spirit of the invention as set forth in the appended claims and that, in some cases, certain features of the invention may be used to advantage without a corresponding use of other features.

Having now described the invention, what is claimed as new and novel and which it is desired to secure by Letters Patent is:

1. Apparatus for use in a tape transport comprising a vacuum brake surface having a plurality of slots cut in the surface thereof along the path of travel of a flexible tape, said slots being uniformly displaced across the brake surface and being adapted to engage one side of said tape, and a tape data record transfer means having a plurality of adjacent heads being positioned adjacent said tape on the other side thereof to transfer data relative to said tape in a plurality of channels extending along the length of said tape, said transfer means being positioned relative to said tape so that the point of junction between each adjacent head falls in a longitudinal line extending along the length of said tape and which line passes over a slot in the associated brake surface.

2. In combination in a tape transport, a vacuum brake surface for stopping a movable tape, said surface having a plurality of slots cut in the surface thereof along the path of travel of the tape and displaced across the brake surface, and a tape data record transfer means having a plurality of adjacent heads positioned adjacent the tape to transfer data relative to the tape in a plurality of channels, said transfer means being positioned relative to said tape so that a line passing through the junction between each adjacent head falls in a longitudinal line on said tape which passes over a slot in the associated brake surface and so that any tape wear caused by the tape passing over said slots is concentrated in an area between adjacent heads 3. Apparatus for use in a tape transport comprising a vacuum-actuated tape movement control surface having a plurality of slots cut in the surface thereof along the path of travel of the tape, said slots being laterally displaced across the control surface, and a tape data record transfer means having a plurality of adjacent heads adapted to transfer data relative to said tape in a plurality of channels, said transfer means being positioned relative to said tape so that a line extending through each junction between each adjacent head falls in a line parallel to the path of travel of the tape and which line passes over a slot in the associated control surface and so that any tape wear caused by the tape passing over said slots is concentrated in an area between adjacent heads.

4. In combination, a tape movement control surface for a tape transport comprising a base member having a plurality of slots cut in the tape-engaging side of said base, said slots being positioned to extend along the path of travel of the tape and being adapted to be connected to a pneumatic signal source to control tape movement, said slots further being positioned laterally in said base relative to the path of travel of the tape so as to define a plurality of displaced land areas on said side of said base, and a tape data transfer means having at least one transfer channel, said transfer means being positioned relative to said tape to effect the transfer of data with respect to said tape in a channel which is aligned with a land on said control surface.

5. In combination, a tape movement control surface for a tape transport comprising a base member having a plurality of slots cut in the tape-engaging side of said base, said slots being positioned to extend along the path of travel of the tape and being adapted to be connected to a pneumatic signal source to control tape movement, said slots further being positioned laterally in said base relative to the path of travel of the tape so as to define a plurality of displaced land areas on said side of said base, and a tape data transfer means having a plurality of channels, said transfer means being positioned relative to said tape to effect the transfer of data with respect to said tape in a plurality of channels, each of which is aligned with a land on said control surface.

6. In combination, a tape brake surface for a tape transport comprising a base member having a plurality of slots cut in the tape-engaging side of said base, said slots being positioned to extend along the path of travel of the tape and being adapted to be connected to a pneumatic signal source to control the stopping of the motion of the tape, said slots further being positioned laterally in said base relative to the path of travel of the tape so as to define a plurality of displaced land areas on said side of said base, and a tape data transfer means having a plurality of separate data transfer channels, said transfer means being positioned relative to said tape to effect the transfer of data with respect to said tape in a plurality of channels, each of which is aligned with a land on said brake surface.

7. In combination in a data transfer tape transport, a tape movement control apparatus being adapted to operatively engage the tape at a plurality of restricted positions across the tape so that, as the tape is moved, said positions define a plurality of longitudinal paths extending along the length of the tape, and a plurality of data transfer means being positioned relative to said tape to transfer data with respect to said tape between each of said paths.

8. In combination in a data transfer tape transport, a tape movement control apparatus being adapted to operatively engage the tape along a plurality of restricted paths extending along the length of the tape and positioned across the tape as the latter is moved, and a plurality of data transfer means being positioned relative to said tape to transfer data with respect to said tape between each of said paths.

9. In combination in a data transfer tape transport, a tape movement control apparatus being adapted to operatively engage the tape at a plurality of restricted positions extending across the tape which, as the tape is moved, define a plurality of longitudinal paths extending along the length of the tape, and a plurality of data transfer means centered between said paths and being adapted to transfer data with respect to said tape.

References Cited by the Examiner

UNITED STATES PATENTS

| | | | |
|---|---|---|---|
| 2,612,566 | 9/1952 | Anderson et al. | 179—100.2 |
| 2,747,025 | 5/1956 | Selsted | 226—95 |
| 2,866,637 | 12/1958 | Pendleton | 179—100.2 |
| 3,151,796 | 10/1964 | Lipschutz | 340—174.1 |

BERNARD KONICK, *Primary Examiner.*

IRVING SRAGOW, *Examiner.*

P. ROTH, R. M. JENNINGS, *Assistant Examiners.*